Jan. 7, 1969     O. LANG     3,420,115

FRICTION DISC FOR FRICTION DRIVES

Filed Oct. 31, 1966

United States Patent Office 3,420,115
Patented Jan. 7, 1969

3,420,115
FRICTION DISC FOR FRICTION DRIVES
Otto Lang, Schweinfurt, Germany, assignor to Firma Kugelfischer Georg Schafer & Co., Schweinfurt, Germany
Filed Oct. 31, 1966, Ser. No. 590,764
Claims priority, application Germany, Nov. 10, 1965, K 57,627
U.S. Cl. 74—215                   4 Claims
Int. Cl. F16h 55/34

ABSTRACT OF THE DISCLOSURE

A friction disc for friction drives for high-speed spindles, especially spindles for crimping synthetic threads, characterized in that the disc carrier or hub of the disc is made of a non-resilient material (e.g. aluminum) and the rim of the disc is made of a resilient synthetic resin (e.g. polyurethane).

---

The invention relates to a friction disc for friction drives for high-speed spindles, especially spindles for crimping synthetic threads.

It is generally known to provide friction discs of the above type which are made of resilient synthetic resin, especially polyurethane, in order to obtain favorable friction characteristics for driving the spindle, and at the same time minimize wear.

It has, however, been discovered that these known friction discs become deformed in an undesirable manner in use, due to the large centrifugal forces which arise as a result of the high rotational speeds of the disc.

It is therefore an object of the present invention to overcome the above-mentioned defect by providing a friction disc for friction drives for high-speed spindles, having a carrier or hub made of non-resilient material such as aluminum, and a rim of resilient material such as polyurethane. As a result of this arrangement, the friction disc of the present invention, in addition to eliminating the defect mentioned above, can be manufactured at a relatively lower cost.

It is a further object of the preset invention to provide a friction disc having a hub and a rim mechanically keyed to the hub, which results in a particularly effective connection between these members.

It is still a further object of the present invention to provide a friction disc having a hub which is provided with closely spaced axial holes on a pitch circle close to its periphery. By this arrangement, the material of the rim can be forced into these holes, preferably under pressure, which allows the engagement between the rim and the hub to withstand extreme shearing forces.

It is still a further object of the present invention to provide a friction disc having a hub provided with a flange which has annular shoulders formed on both sides thereof.

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope.

Figure 1:
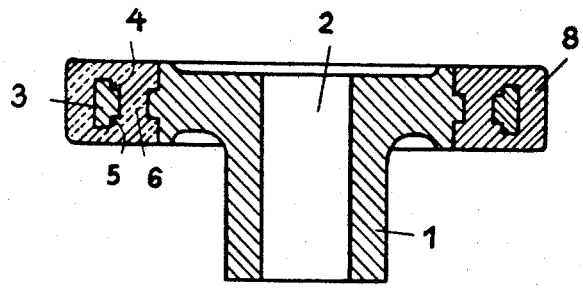
Figure 2:
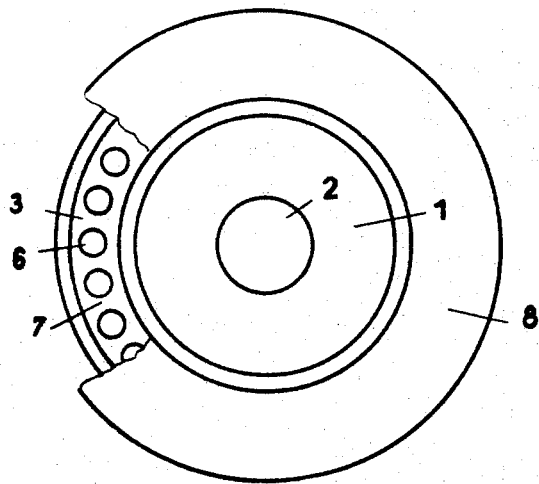

FIG. 1 is a longitudinal sectional view of the friction disc of the present invention, and FIG. 2 is a partially cut-away plan view of the friction disc of the present invention.

Referring specifically to FIGS. 1 and 2 of the drawings, the reference numeral 1 refers to the carrier or hub of the disc of the present invention. Hub 1 is preferably made of aluminum, although a suitable non-resilient synthetic resin could equally well be used. The hub has a bore 2 by which it can be mounted on the shaft of a high-speed spindle. The flange portion 3 of the hub 1 has annular shoulders 4 and 5 on its two faces and a plurality of holes formed therein, which are closely spaced and lie on a pitch circle 7 close to the periphery of the flange.

The rim 8 of the disc is made of a resilient synthetic resin, such as polyurethane, and is mounted on the hub 1, preferably with the use of pressure, so that the synthetic resin, which is fluid during the assembly, penetrates into the holes 6 and thereby anchors the rim 8 rigidly and effectively in the hub 1.

By the above-mentioned use of synthetic resin, the friction disc of the present invention is cheaper to manufacture than known discs which are made wholly of resilient synthetic resin since this material is relatively high in cost. The construction of the hub or carrier described above, and in particular its flange portion, in conjunction with the resilient synthetic resin mounted on it, permit the outer face portion of the synthetic resin to lift lightly against the face of the flange on the hub under the action of the large centrifugal forces occurring at high speeds, and thereby results in a particularly good frictional engagement.

Of course, variations of the specific construction and arrangement of this type mechanism herein disclosed can be made by those skilled in the art without departing from the invention as defined in the appended claims.

What is claimed is:

1. A friction disc for friction drives for high speed spindles, especially spindles for crimping synthetic threads, said disc comprising a hub constructed of one piece of rigid material and having an axial bore passing therethrough for mounting said disc on a shaft of said high speed spindle, a radially outwardly directed flange integral with said hub and provided with annular recesses on both its faces, which recesses extend axially into the flange to define annular shoulders on both faces, and a rim made of resilient synthetic resin and being mechanically keyed to the hub.

2. A friction disc according to claim 1 in which the flange of the hub is provided with closely spaced axial holes lying on a pitch circle close to the periphery into which holes the material of the rim is forced under pressure.

3. A friction disc according to claim 1 in which the annular shoulders are provided on the outer periphery of the hub of the disc.

4. A friction according to claim 2 in which the annular shoulders are provided on the outer periphery of the hub of the disc.

References Cited

UNITED STATES PATENTS

| 414,307 | 11/1889 | Gorhan | 74—215 |
| 761,384 | 5/1904 | Lambert | 74—215 |
| 1,421,231 | 6/1922 | Henninger | 74—215 |
| 1,665,902 | 4/1928 | Bastian | 74—215 |
| 2,383,194 | 8/1945 | Hoopes | 74—215 XR |
| 2,720,119 | 10/1955 | Sherman | 74—215 XR |
| 2,836,982 | 6/1958 | Voss et al. | 74—214 |
| 3,180,171 | 4/1965 | Arpin | 74—214 XR |
| 3,289,487 | 12/1966 | Weedfall | 74—214 |

FOREIGN PATENTS 1,129,024    4/1962    Germany.

CORNELIUS J. HUSAR, Primary Examiner.